United States Patent Office 3,508,141
Patented Apr. 21, 1970

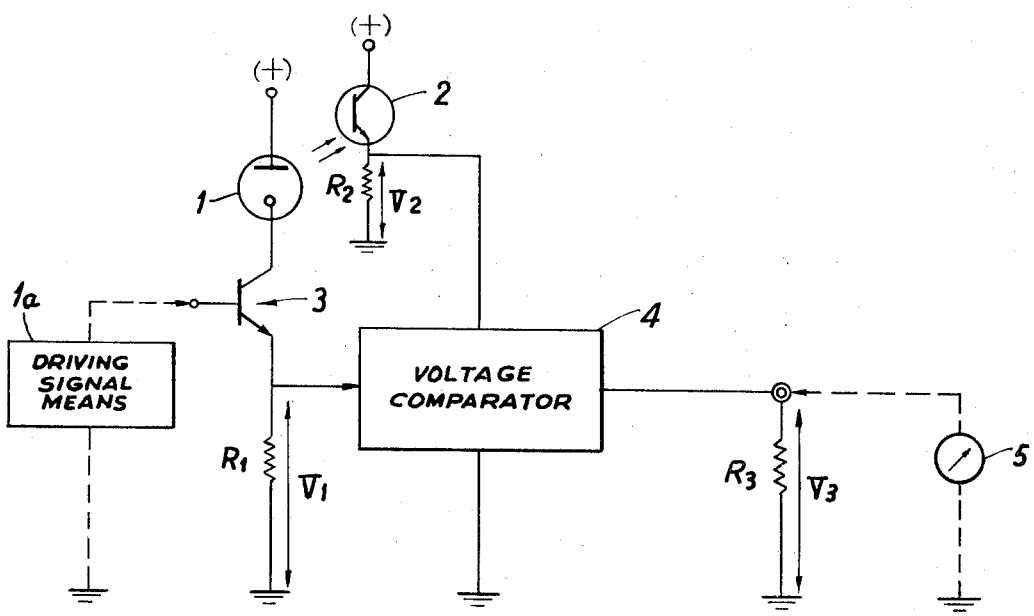

3,508,141
DETERIORATION DECISION SYSTEM FOR PHOTOTELEGRAPHIC RECEIVER GLOW MODULATION TUBE
Kunio Tanaka and Takashi Ogawa, Tokyo, Japan, assignors to Nippon Electric Company Limited, Tokyo, Japan, under the law of Japan
Filed Feb. 7, 1968, Ser. No. 703,757
Claims priority, application Japan, Feb. 9, 1967, 42/7,912
Int. Cl. G01r 31/22
U.S. Cl. 324—24                                                5 Claims

ABSTRACT OF THE DISCLOSURE

A method and circuit are provided for determining the degree of deterioration of a glow modulation tube, the circuit including means for developing a voltage $V_1$ proportional to the discharge current of the tube, means for developing a voltage $V_2$ proportional to the light output of the tube, a voltage comparator for comparing a change of voltage $V_2$ with respect to the voltage $V_1$ after a period of time, and indicator means for reading such change as indicative of said degree of deterioration.

Background of the invention

As those knowledgeable in the art are aware, there is no circuit to date which can determine in a simple manner the degree of deterioration of a glow modulation tube used as the light source for photoelectric conversion in a phototelegraphic receiver. In order to determine whether a glow modulation tube has deteriorated, its optical output is compared with the memorized value of the optical output of a normal glow modulation tube. Such tubes, however, are extraordinarily unstable, and due to this reason and also due to the inaccuracies involved, it cannot be determined quantitatively whether or not the quality of deterioration of the received record is due to the deterioration of the glow modulation tube, or to what degree the tube has deteriorated, or whether it is better to replace the tube at the time. Consequently, the question of replacement is decided either by experience or as a result of extreme quality deterioration of the received picture. Therefore phototelegraphic reception is sometimes carried on with no realization of the deterioration and furthermore, an invaluable telephoto is often spoiled.

Objects of the invention

It is an object of this invention to provide a method and a means for accurately determining the degree of deterioration of a glow modulation tube.

Another object is to provide a simple method for determining the quality of a glow modulation tube at any given time.

All of the objects, features and advantages of this invention and the manner of attaining them will become more apparent and the invention itself will be best understood by reference to the following description of an embodiment of the invention taken in conjunction with the accompanying drawing.

Brief description of the drawing

The drawing shows on embodiment of a circuit for determining the degree of deterioration of a glow modulation tube in accordance with the principles of this invention.

Summary of the invention

The present invention, being incorporated in a phototelegraphic receiver, makes it possible to now determine in a simple manner the degree of deterioration of a glow modulation tube, and is characterized by a circuit and a method which includes (a) utilizing the fact that the deterioration of a glow modulation tube is indicated by the variation of relation between the discharge current and the brightness, (b) comparing two voltages with each other by means of a voltage comparator, one being a proper voltage converted by a resistor from the discharge current of the glow modulation tube and the other being a photo-voltage generated by receiving, by means of a suitable photoelectric conversion element, the brightness of the glow modulation tube, viz, the optical output, and (c) indicating with a voltmeter the output voltage generated by the unbalance between said two voltages, or activating an indication lamp with a switching element which operates at a voltage not lower than a predetermined reference voltage. To accomplish this, the voltage comparator for comparing the normal glow modulation tube current with the photocurrent, is set to be initially balanced and keen in sensitivity so that the circuit unbalance due to the deterioration may be directly indicated. Not only the deterioration but also the exchange time of a glow modulation tube can be indicated by utilizing the differential output as taught herein.

Preferred embodiment of the invention

One embodiment of the present invention will now be explained, referring to the drawing, which shows a circuit wherein the cathode of a glow modulation tube 1 is connected to the collector of a transistor 3. The emitter of the transistor 3 is grounded via a resistor $R_1$ and is also connected to a voltage comparator 4, to provide an input thereto. The base of the transistor 3 is supplied with an input driving signal for the glow modulation tube 1 from any suitable driving signal means 1a. A photo-conversion element is also provided, such as a phototransistor 2, the emitter thereof being grounded via a resistor $R_2$ and also being connected to the voltage comparator 4 as the other input thereof. The output of the voltage comparator 4 generates a voltage $V_3$ across a resistor $R_3$ connected to the output thereof.

The voltages across the resistors $R_1$ and $R_2$ are designated as $V_1$ and $V_2$, respectively. Thus when the properly preset voltage for the glow modulation tube is applied to the base of the transistor 3, the responding discharge current flows in the glow modulation tube 1, generating the voltage $V_1$ across the emitter resistor $R_1$. On the other hand, the optical output of the glow modulation tube 1 is received by the photo conversion element 2, and a photocurrent flows in proportion to the brightness of the glow modulation tube 1, generating a voltage $V_2$ across the resistor $R_2$ also in proportion to the tube brightness. When the voltages $V_1$ and $V_2$ thus generated are compared with each other by the comparator 4, if the comparator is set so that the output voltage $V_3$ indicates zero for a normal glow modulation tube, then it can be arranged that the voltage $V_1$ does not change so long as the driving input is constant, even if the glow modulation tube has deteriorated. However, the voltage $V_2$ decreases proportionately with decreasing brightness of the glow modulation tube 1; under such condition, the voltage comparator 4 begins to be gradually unbalanced, generating an output voltage $V_3$ across the resistor $R_3$ corresponding to the difference between $V_1$ and $V_2$. By indicating this output voltage $V_3$ with a suitable indicator lamp or meter 5, the state of the glow modulation tube 1 in use can be determined and the time for replacement with a new one is easily ascertained.

Thus it is now possible to easily and conveniently determine the degree of deterioration of a glow modulation tube in a phototelegraphic receiver by incorporating the above-described comparator circuit comprising a photo-conversion element, a voltage comparator and a resistor into the receiver. Thus by balancing the circuit each time a glow modulation tube is replaced with a new one, it is possible to simply and accurately determine the degree of deterioration of the glow modulation tube after any desired period of use thereafter.

What is claimed is:

1. In a deterioration decision system for a glow modulation tube in a phototelegraphic receiver, a method for determining the degree of deterioration of the glow modulation tube which comprises:

providing a first voltage proportional to the discharge current amplitude of the glow modulation tube, providing a second voltage corresponding to a photovoltage generated by receiving the optical output of the glow modulation tube with a suitable photoelectric conversion element, applying said first and second voltages to the inputs of a voltage comparator, initially establishing a reference condition at the output of said comparator indicating proper operation of said glow modulation tube, comparing said first and second voltages in said comparator to indicate the condition of said glow tube at at time thereafter, and sensing any change of the output of said comparator from the reference condition thereof, thereby to indicate the degree of deterioration of said glow modulation tube from said reference condition.

2. A system for determining the degree of deterioration of a glow modulation tube comprising:

means for generating a first voltage proportional to the discharge current amplitude of the glow discharge tube, a photoelectric conversion element positioned proximate to said glow discharge tube to receive the light output therefrom, means for generating a second voltage proportional to a photovoltage developed by said photoelectric conversion element, a voltage comparator having first and second inputs and an output, means for applying said first and second voltages to said comparator first and second inputs, respectively, means for establishing a reference signal at said comparator output to indicate a first normal condition of said glow modulation tube, means operatively connected to said comparator output for sensing a second condition of said tube at a time later than said first condition, indicator means coupled to said sensing means for indicating a change from the normal condition of said comparator, whereby the degree of change represents the degree of deterioration of said glow modulation tube from said normal condition.

3. The invention described in claim 2 wherein said indicator means comprises a voltmeter.

4. The invention described in claim 2 wherein said photoelectric conversion element comprises a phototransistor.

5. The invention described in claim 4 wherein:

said means for generating said first voltage includes a resistor in series with the anode-cathode circuit of said glow modulation tube, and said means for generating said second voltage includes a resistor in series with the emitter-collector circuit of said phototransistor.

References Cited

UNITED STATES PATENTS

| 2,390,833 | 12/1945 | Haynes | 324—20 XR |
| 2,632,358 | 3/1953 | Ehat | 324—20 |
| 2,765,440 | 10/1956 | Adelman | 324—20 |

RUDOLPH V. ROLINEC, Primary Examiner

E. L. STOLARUN, Assistant Examiner